United States Patent [19]
Oliveira Da Cunha Lima

[11] Patent Number: 5,516,809
[45] Date of Patent: May 14, 1996

[54] METHOD FOR OBTAINING AN ELASTOMER PRODUCT WITH HIGH PETROLEUM AND ITS BY-PRODUCTS ABSORPTION POWER

[75] Inventor: Luiz C. Oliveira Da Cunha Lima, Rio de Janeiro, Brazil

[73] Assignee: Relastomer S/A, Rio de Janeiro, Brazil

[21] Appl. No.: 232,441

[22] Filed: Apr. 21, 1994

Related U.S. Application Data

[63] Continuation of Ser. No. 842,387, May 26, 1992, abandoned.

[30] Foreign Application Priority Data

Jul. 26, 1990 [BR] Brazil ..................... 9003625

[51] Int. Cl.⁶ .............. C08J 11/04; C08K 3/08; C02F 1/24
[52] U.S. Cl. .................. 521/41; 521/41.5; 521/44; 521/44.5; 521/45.5; 210/671
[58] Field of Search .............. 521/41, 41.5, 44, 521/44.5, 45.5; 210/671

[56] References Cited

U.S. PATENT DOCUMENTS

| | | | |
|---|---|---|---|
| 1,374,231 | 4/1921 | Porzel | 521/44.5 |
| 2,794,057 | 5/1957 | Gunther | 521/44.5 |
| 4,098,737 | 7/1978 | Lee et al. | 521/44 |
| 4,161,464 | 7/1979 | Nicholas | 521/41.5 |
| 4,257,925 | 3/1981 | Freeguard | 521/44.5 |
| 4,420,400 | 12/1983 | Weitzen | 210/710 |
| 4,758,354 | 7/1988 | O'Mara | 523/201 |
| 4,839,392 | 6/1989 | Kromrey | 521/45 |
| 5,066,405 | 11/1991 | Liston | 210/693 |

FOREIGN PATENT DOCUMENTS

| | | |
|---|---|---|
| 505156 | 5/1939 | United Kingdom . |
| WOA105192 | 9/1986 | WIPO . |
| 92001745 | 2/1992 | WIPO . |

OTHER PUBLICATIONS

WO,A1,86/05 192 (Oliveira Da Cunha Lima) 12 Sep. 1986, See Claims; p. 1, Lines 3–30, Example 2.
Derwent Acession No. 77–315 13Y (WPI) & JP A,50/98 987 (Toyo Rubber Ind. K.K.) Aug. 6, 1975.

*Primary Examiner*—Paul R. Michl
*Assistant Examiner*—Olga Asinovsky
*Attorney, Agent, or Firm*—Cushman Darby & Cushman

[57] ABSTRACT

Methods for obtaining an elastomer product capable of absorbing petroleum and its by products including the steps of forming a mixture of waste vulcanized rubber, resin and organic solvent, grinding the mixture in a mill in the presence of manganese to produce a slurry of very small particles of a reclaimed rubber, and drying the slurry which results in porous elastomer particles which are capable of absorbing petroleum and its by-products.

8 Claims, No Drawings

METHOD FOR OBTAINING AN ELASTOMER PRODUCT WITH HIGH PETROLEUM AND ITS BY-PRODUCTS ABSORPTION POWER

This is a continuation of application Ser. No. 07/842,387, filed on May 26, 1992, now abandoned.

The present invention is related to a method for obtaining an elastomer product, in powder or grains, which can absorb great ammounts of petroleum and its by-products.

The product is derived from devulcanized rubber artefacts, like tire, heels, soles, rugs, etc., added or not to other products wich give it a better application. A solvent is added to the batch and it is crushed into powder. Its application onto petroleum or its by-products is simple: it is only necessary to pour over the spot one or more layers, depending of the thickness of the floating petroleum. After some time the rubber powder agglomerate absorbs the petroleum and its by-products, forming a slurry wich can be removed and recycled, if desired, or burnt.

As is of public knowledge, there are many methods for decontamination of petroleum spillings, namely at sea, but none of them is really effective in relation to nature preservation. One of the most known methods is to blend to the spilled petroleum an emulsifier, in wich the petroleum is mixed to the sea water, thus disappearing from sight. What truely happened was only a grater pollution, since the petroleum was not removed and besides the emulsifier, wich is in itself a great polluter, was added. Another known method is to add one jellyfier element wich absorbs the petroleum and sinks with it, covering the bed of the environment where the petroleum was spilled. In this case, not only the pollution is transferred from up to down, but another pollutant was added: the jellyfier agent, wich drowses the flora and the fauna of the environment. There are still other methods, like surrounding the spilled petroleum spot with floaters and, at the same time, trying to pump the petroleum with centrifugal pumps on board of special boats, wich seclude the petroleum, rendering the water back to the environment. It is a less polluting method, but it can only be applied to little spillings. All those methods untill now applied are too expensive or merely transfer the pollution to another place. In the other hand, when the petroleum is scattered over rocks or absorbed by sane, it becomes difficult to seclude it because, owing to its high viscosity, it becomes entangled to any product over whose surface it lays.

According to the present manufacturing method, a product is provided whose density may be equal to or less than that of the water, and is produced in the form of powder or grains, having high petroleum and its by-products absorption power, at a less expensive price than any other method. It is important to mention that the application of a low cost raw material, as is the case of discarded rubber products, like tires, makes it possible to reduce another pollution source of difficult elimination.

The present method consists of grinding little pieces of vulcanized rubber along with resins, oils, devulcanizers, pigments, etc., and with solvent untill they are transformed into a very fine and seemingly unpalpable solution and/or suspension, and drying it after into powder or little grains, or chips, in a way they can be dispersed over the surface of the spilled petroleum or its by-products. The choice of the products to be blended in the manganese steel ball mill will depende exclusively of the kind of material to be absorbed. For instance, if the spilled product is a lubricating oil, it would be advisable to use one kind of resin more compatible with paraffines; if, for instance, the oil is highly aromatic, it would be advisable to use one kind of resin more compatible with the aromatics; and so on.

However, it is known that the majority of vulcanized rubber compositions have a density higher than water, being thereby necessary to add one kind of pure rubber, whose density is about 0.92, providing the final product with an adequate density for absorbing the desired material. If the environment where the petroleum and its by-products were spilled is water, the density has to be not higher than 1. If the environment where the spilling happened is on land, then there will be no need to have low densities, wich could be even higher than 1.

However, there are cases in wich it is necessary that the absorbing product have an absorption degree higher than vulcanized rubber. Then it is possible to use one pure rubber, like natural rubber, SBR, IR, etc. There also are cases in wich, in order to provide a better resistance to the product swollen with petroleum and its by-products, it is necessary to increase the number or to create new crosslinking points, wich arises the need of adding to the product, after its solution or dispersion in the mill, a certain ammount of vulcanizer agent.

The use of the solvent as a means of making the vulcanized rubber soluble or dispersed is essential, because, in the drying where the slurry that comes from the mill is transformed into powder or grains, it becomes porous, alowing the absorption to happen, not only inside the macromolecule, but also into the pores of the powder or grains.

The choice of the size of the powder or grains will also depend of the needs of the application. Thus, in a windy weather, it would be wasteful using too much fine particles, and therefore it would be necessary to use greater particles.

One can also use plates or sheets of particles, linked by elements foreign to the medium, like very fine wires, or linked to each other with resins, adhesives, etc., or by mere compression or heat binding.

Several example batches were made:

EXAMPLE 1

About 200 g of tire chips (d=1.13), 287 g of shoe soles of vulcanized pure rubber (d=0.92), 10 g of phenolic resin, 1 g of devulcanizer and 2,800 g of toluene were put into a manganese steel ball mill. The batch was ground till the product became reduced into a impalapable slurry. The product was removed and dryed, being transformed into grains (30 mesh). About 100 g of petroleum were spilled on a tray filled with water. Over the floating petroleum, about 20 g of the grains obtained above were pulverized with the aid of a 20 mesh sieve. After a 2 hours resting period all petroleum was absorbed.

EXAMPLE 2

The same experiment (Example 1) was repeated, only instead of allowing the water to rest, it was constantly stirred up. It was observed, as one could foretell, that the absorption happened in a much quicker pack; instead of 2 hours, all petroleum was already absorbed in 20 minutes.

EXAMPLE 3

About 300 g of tire chips (d=1.11), 230 g of polyisoprene (d=0.92) and 2,800 g of trichloroethylene were put into a manganese steel ball mill. The product was ground until it was transformed into an impalpable slurry. It was blended with monofilament pieces, rayon staples, and dryed in heaten cilinders. The 2 mm thick sheet was cut into 50×50 mm pieces. About 100 g of petroleum were spilled onto a tray filled with water and covered up with pieces of the rubber sheet prepeared above. The petroleum with completely absorbed, being secluded from the water.

EXAMPLE 4

The same experiment (Example 3) was repeated, being the powder dispersed over a screen about 100 mesh, well teased, clamped by the edges and with a low pressure on it, in a way that the powder became entangled and would not come free when pulverized with an alchool dissolved resin, unsoluble in water or petroleum and its by-products.

After it was dryed, the agglutinate sheet was cut into 50×50 mm pieces. Fuel oil was spilled onto a tray filled with water and over it the plates prepeared above were placed. The oil was fully absorbed and secluded from the water.

EXAMPLE 5

About 400 g of pre-vulcanized rubber, chopped into little pieces, about 2×2 mm, along with 2,800 g of toluene were put into a manganese steel ball mill and ground into an impalpable slurry. The product, after drying and transforming into powder, was dispersed over the surface of the petroleum spilled onto the water, in the same way and same ammounts of Example 1. All petroleum was absorbed.

I claim:
1. A method of obtaining an elastomer product capable of absorbing petroleum and its by-products comprising the following steps:
   forming a mixture of waste vulcanized rubber, resin and solvent;
   grinding said mixture in a mill in the presence of manganese to produce a slurry of very small particles of a reclaimed rubber;
   drying said slurry which results in porous elastomer particles which are capable of absorbing petroleum and its by-products.
2. A method, according to claim 1, wherein said waste rubber is selected from the group consisting of tire chips, discarded heels, soles, rugs and latex artifacts, burrs, tires, and pre-vulcanized rubbers.
3. A method, according to claim 1, wherein said mixture further includes used green rubber or oils.
4. A method, according to claim 1, wherein said mixture further includes the ingredient of pure rubber.
5. A method according to claim 1 wherein said porous elastomer particles are linked to each other by heating to form porous elastomer sheets.
6. A method of obtaining an elastomer product capable of absorbing petroleum and its by-products comprising the following steps:
   forming a mixture of waste vulcanized rubber, resin and organic solvent;
   grinding said mixture in a mill in the present of manganese to product a slurry of very small particles of a reclaimed rubber;
   blending fibers into said slurry; and
   heating and drying said slurry to product porous elastomer sheets which are capable of absorbing petroleum and its by-products.
7. A method, according to claim 1 wherein said organic solvent is not soluble in water.
8. A method, according to claim 1 wherein said organic solvent is toluene or trichloroethylene.

\* \* \* \* \*